United States Patent [19]

Hill, Jr.

[11] 4,212,110

[45] Jul. 15, 1980

[54] APPARATUS FOR MARKING BUILDING PANELS

[75] Inventor: Duncan E. Hill, Jr., Paramus, N.J.

[73] Assignee: Design Maintenance Corporation, Palisades Park, N.J.

[21] Appl. No.: 921,215

[22] Filed: Jul. 3, 1978

[51] Int. Cl.² .................................................. G01B 3/14

[52] U.S. Cl. ................................ 33/174 G; 33/180 R; 33/DIG. 10

[58] Field of Search ........ 33/180 R, 174 G, DIG. 10, 33/189, 1 G, 174 B

[56] References Cited

U.S. PATENT DOCUMENTS

| | | | |
|---|---|---|---|
| 1,362,726 | 12/1920 | Mason | 33/189 |
| 3,913,235 | 10/1975 | Tenneson et al. | 33/DIG. 10 |

*Primary Examiner*—Willis Little

*Attorney, Agent, or Firm*—Thomas G. Ryder

[57] ABSTRACT

An apparatus for accurately and conveniently locating on the surface of a building panel the location where such panel is to be "cut", i.e. sawn, drilled, cutout, etc. The apparatus comprises a planar body conforming generally to the shape of the panel and which can be superimposed both on the panel and over the work area where a panel will eventually be placed. The planar body is provided with a matrix of openings as well as with markers. When the body is superimposed on the work area, the markers are placed through the openings corresponding to the location of the required cuts and the body is then superimposed and registered with a panel; whereby the markers indicate on the surface of the panel the portions thereof to be cut.

7 Claims, 14 Drawing Figures

APPARATUS FOR MARKING BUILDING PANELS

BACKGROUND OF THE INVENTION

In many areas of fabrication, such as, for example, the construction of buildings, the technique employed is to utilize panels of a standardized size in the assembly or fabrication of the item. In the construction industry panels of sheetrock, plywood, wood paneling, plaster board, etc. are used extensively. When such panels are employed, it is necessary to locate the portions thereof which must be cut away in order to provide openings through the panel as required for junction boxes, electrical outlets, windows, doors, plumbing fixtures, etc. Traditionally, it has been necessary for the worker in the industry to take a multiplicity of measurements, both vertically and horizontally, in order to define the location of such a common item as an electrical outlet box. Additionally, the dimensions of the item requiring the cut in the panel must also be determined. These measurements must then be transposed onto the paneling material. While this has not been an impossible task, it is extremely time consumming and, as the degree of accuracy or precision in locating these cuts increases, so also does the amount of time required. Further, it is necessary to determine the area of a panel which will overlie the studding to which the panel is to be nailed.

SUMMARY OF THE INVENTION

I have developed an apparatus which efficiently and accurately locates portions of a work area which will require a panel to be cut and indicates on the panel the location of such cuts, all without the necessity of taking measurements. Similarly, my apparatus locates the relative location of studs.

The apparatus of my invention comprises a planar body conforming to the shape of a panel and adapted to be superimposed on and register with the panel. This body is also adapted to be superimposed on a work area. The planar body is provided with a matrix of openings extending through the body. Separate marking means, capable of marking the surface of a panel, are also provided. These marking means are adapted for insertion through and registration in the openings extending through the body.

In use, the planar body is positioned superimposing a work area which will require a panel having certain cuts in it, such as, for example, the portion of the wall of a building requiring cutouts for electrical outlets, heating vents and windows. After placing the planar body in its position superimposed over the work area, the marking means can be inserted into the openings through the body in positions corresponding to the limits of the cuts to be made in the panel and to the location of studs. With the marking means registered in the planar body, the body is then superimposed on and registered with a panel. In this manner the registered marking means are capable of marking the surface of the panel thereby simply, accurately, and rapidly indicating the portions of the panel to be cut as well as the position of studs.

While it is not always necessary for the planar body of my invention to correspond exactly in dimensions to the panel to be cut, such relationship is convenient. Thus, in the situation of the standard size of plywood or other wood paneling, both the panel and the planar body of my apparatus have the same dimensions, i.e. 4 feet by 8 feet.

The planar body of my apparatus can be fabricated from a variety of materials including, for example, wood, plastic, and metal. Advantageously, the planar body of the apparatus is totally transparent and, thus, for example, can be fabricated of a material such as polycarbonate which provides rigidity and strength in addition to transparency. Depending upon the size and distribution of the openings through the planar body and, particularly dependent upon the ratio of continuous solid material to the void space comprising the openings through the body, the body itself can be fabricated from an opaque material, such as for example, metal. In this connection it should be noted that a stamped screen can be satisfactorily employed. Another satisfactory embodiment of the planar body is the so-called "egg carton" type of construction comprising a lattice of thin sheets intersecting at right angles to form a matrix of quadrilateral openings.

The marking means of my invention are of a shape to conform to the shape of the openings through the planar body, to register in such openings, and to be retained by the side walls of such openings. Generally, the marking means, when registered in the planar body, will be extendable beyond such body so as to be capable of marking a panel when the apparatus of my invention is superimposed on such panel. The marking means can be of the stylus type designed to scrape or scribe a marking on the surface of the panel or they can be of the type designed to paint or ink a marking on the surface of the panel.

DESCRIPTION OF THE DRAWINGS

In order to describe my invention in greater detail, reference is made to the attached drawings wherein:

Referring now to FIG. 1, there can be seen a work area in the form of the wall of a building under construction. Shown in this figure, are vertical studs 10, 12, 14 and 16 heating vent 18, and electrical outlet box 20. Also shown in this figure, is a horizontal member 22 constituting the lower end of a window frame.

Figures 1, 5, 6, 7, 8:
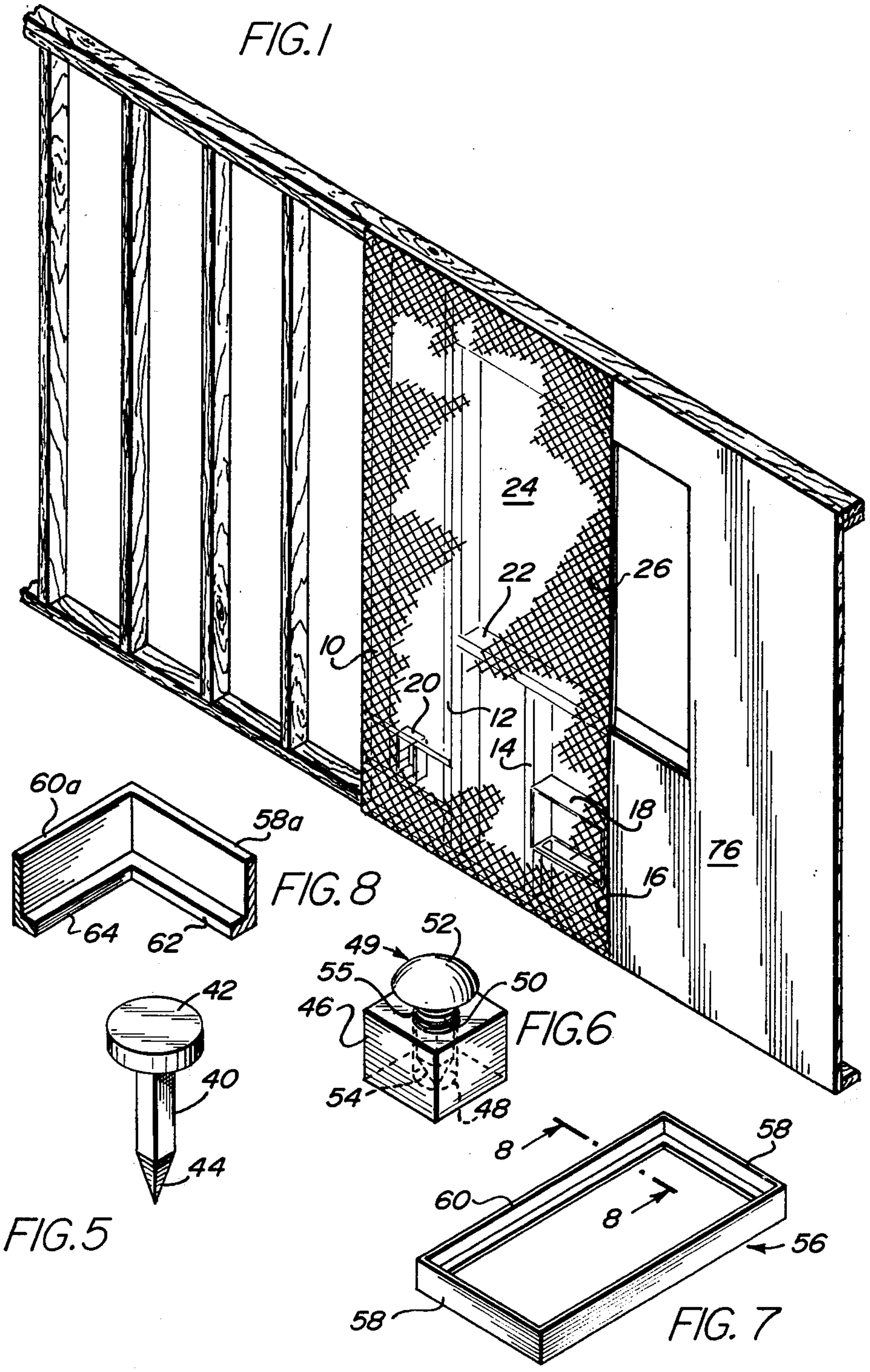
FIG. 1 is an isometric view of the apparatus of my invention superimposed on a work area comprising the wall of a building.
FIG. 5 shows one type of marking means suitable for use in my invention.
FIG. 6 illustrates another type of marking means suitable for use in my invention.
FIG. 7 is an isometric view of a frame employed for registration of a panel and the planar body in accordance with my invention.
FIG. 8 is an enlarged fragmentary view of a frame similar to FIG. 7.

Superimposed on this work area is an apparatus in accordance with my invention and comprising a planar body 24. As illustrated in this figure, the planar body 24 is fabricated of a transparent material. Reference numeral 26 is employed to indicate a lattice of vertical and horizontal lines representing the matrix of openings through body 24.

Figure 2:
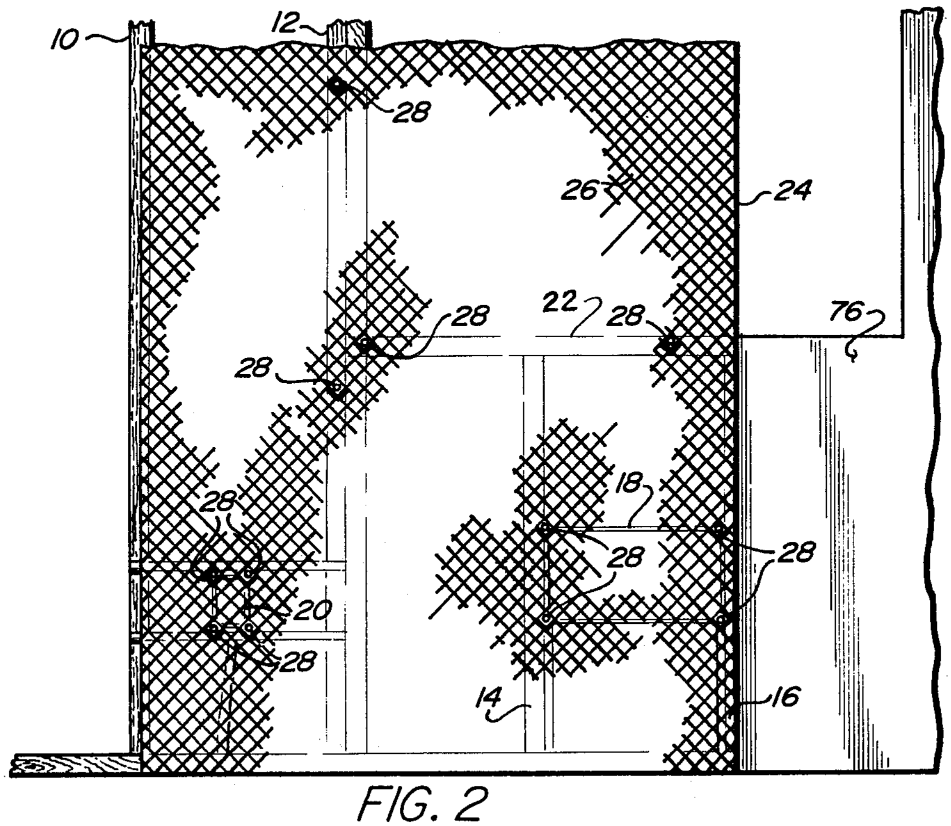
FIG. 2 is an elevation view of the apparatus superimposed over the work area of FIG. 1 with marking means registered in the planar body.

Referring now to FIG. 2, there can be seen an elevation view of the apparatus of my invention superimposed on the work area illustrated in FIG. 1. Again, the same reference numerals indicate the same items as in FIG. 1. In FIG. 2 there is also shown the positioning of a multiplicity of marking means 28 registered in certain of the openings 26 through the body 24. Thus, it will be seen that four of such marking means 28 have been registered in openings 26 through body 24 and positioned so as to correspond to the four corners of heating vent 18. Similarly, four other marking means 28 have been registered in openings through planar body 24 in a manner to correspond to the four corners of electrical outlet box 20.

Also shown in FIG. 2 are three other marking means 28 registered in openings 26 overlying stud 12, thereby locating the relative position of stud 12. In order not to clutter the drawing needlessly, the use of further marking means 28 to locate studs 10 and 14 has not been illustrated. It will be understood, of course, that in an actual employment, additional marking means 28 can be utilized to locate other studs as desired.

Referring now the right side of FIG. 2, it will be seen that other marking means 28 have been positioned so as to mark the juncture of horizontal member 22 and stud 14, the vertical continuation of stud 14 and the horizontal continuation of member 22; thereby defining the limits of a window.

By superimposing body 24 with marking means 28 positioned and registered therein, on a construction panel and registering the edges of planar body 24 with the edges of such construction panel, the marking means extending through body 24 can be caused to mark the surface of such panel thereby indicating the portions thereof to be cut out or the position of studs underlying the panel when in position.

Figure 3:
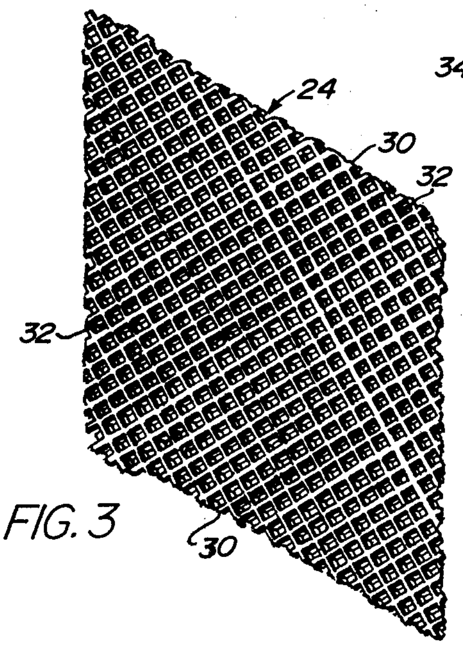
FIG. 3 illustrates an enlarged portion of a planar body in accordance with my invention showing the openings therethrough.

Referring now to FIG. 3, there is an enlarged view of one embodiment of a planar body in accordance with my invention. In this figure, the planar body 24 is composed of a sheet of a continuous solid material 30 containing a matrix of openings 32 extending therethrough. In this figure the openings 32 are diamond or lozenge shape. It will be understood that the openings can be any shape including, hexagonal, squares, circular, etc.

Figure 4:
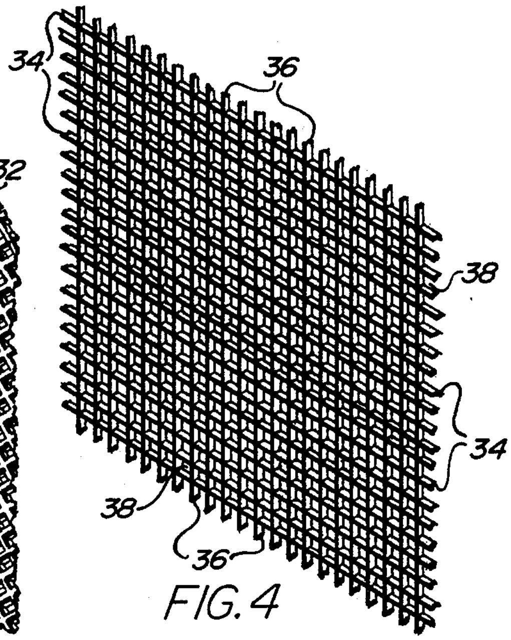
FIG. 4 is an isometric view showing a planar body fabricated in the egg carton style.

In FIG. 4 there is illustrated an egg carton type of construction wherein the planar body of my invention is composed of a first set of parallel (horizontal) plates 34 and a second set of parallel (vertical) plates 36, which sets of plates intersect each other so as to define a matrix of quadrilateral openings. As shown in FIG. 4, the horizontal parallel plates 34 and the vertical parallel plates 36 positioned the same equal distance apart so as to define openings having a square cross-section and indicated by reference numeral 38. In a similar manner, three sets of parallel plates with each set of plates positioned the same equal distance apart and each set of plates disposed so as to intersect the other two sets of plates at an angle of 60° can be employed. The result of such configuration is to define a matrix of openings in the shape of equilateral triangles.

FIG. 5 illustrates one type of marking means suitable for employment in an apparatus of my invention, such as that illustrated in FIG. 4. Such marking means is composed of a shank 40 of square cross-section adapted for positioning in and registration in the square cross-sectional openings 38 as shown in FIG. 4. One end of the shank 40 of the marking means is provided with a head 42 while the opposite end of shank 40 is provided with a stylus point 44. It will be understood that a similar marking means can be fabricated wherein the cross-section of the shank is in the form of an equilateral triangle adapted for registration in openings of the same cross-section. Further, the cross-section of the shank can be in the shape of a diamond or lozenge and suitable for engagement in the openings 32 shown in FIG. 3.

FIG. 6 illustrates another marking means in accordance with my invention which comprises a body member 46 having a cylindrical passageway 48 extending through the body. Associated with the body, is a scribe means 49 comprising a cylindrical shank 50 disposed and extending through the cylindrical passage 48 and having a button head 52 on one end of the shank 50 and a inked marking surface 54 on the opposite end of shank 50. A spring member 55 is disposed between the head 52 and the surface of body member 46 (i.e., a face of the cube) and biases the scribe means 49 upwardly such that the marking surface 54 is removed from contact with an underlying panel. Upon proper positioning of the body member 46 in a planar body 24 and overlying a panel, the head 52 can be depressed thereby compressing spring member 55 and causing marking surface 54 to contact and mark an underlying panel.

As shown in FIG. 6, the body member 46 is in the form of a cube with passageway 48 disposed perpendicular to opposite faces of the cube. A marking means of this type is suitable for use in conjunction with a plannar body of the type illustrated in FIG. 4. The body member 46 can also be circular in cross-section for use with a planar body having circular openings therethrough. Similarly, the body member can also have the cross-section of an equilateral triangle, a diamond or any other desired shape.

In FIG. 7 there is shown an open frame 56 comprised of two parallel opposing longitudinal members 58 and two parallel opposing transverse members 60 joined at their extremities at right angles thereby defining a rectangular frame work. As illustrated in FIG. 7, the longitudinal members 58 are twice the length of transverse members 60 and are appropriately 8 foot and 4 foot long, respectively. A frame of this type is adapted to receive a typical 4 foot by 8 foot building panel or plywood sheet. When the planar body of my invention is also positioned within a frame 56 and superimposed upon a panel, e.g. plasterboard, the frame 56 insures accurate, edge-over-edge registration of the planar body of my invention with the underlying panel. The marking means of my invention can then be caused to mark the underlying panel either by rapping the head of a stylus type marking means or impressing the inking surface of a marking means onto the panel.

FIG. 8 represents a fragmentary view of a modified frame useful in connection with my invention wherein it can be seen that longitudinal member 58*a* and transverse member 60*a* are each provided with inwardly extending lips 62 and 64, respectively. The function of these lips, which extend around the periphery of the frame, is to retain a panel within the frame and prevent it from falling through the frame. This in turn functions to insure the proper registration of the planar body with the panel when superimposed upon the panel in the frame.

Figure 9:
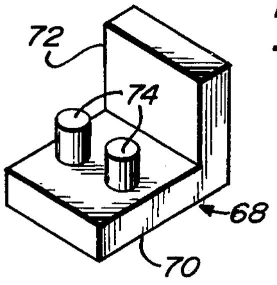
FIG. 9 is an isometric view of a clip which assists in registering a panel and the planar body.

FIG. 9 is an isometric view of a clamp 68 comprised of a generally L-shaped body having a leg portion 70 and a foot portion 72 extending perpendicularly from the leg portion at one end thereof. Also extending perpendicularly from the leg portion 70 in the same direction as the foot portion 72 are a pair of lugs 74. The lugs 74 are adapted to be received in and engaged with two of the matrix of openings 26 extending through planar body 24. As illustrated in FIG. 9, the lugs are cylindrical in shape and, of course, are adapted for use with a planar body of my invention wherein the openings are circular in cross section. The lugs 74 extend perpendicularly from the leg portion 70 a distance equal to the thickness of the planar body 24. The foot portion 72 extends perpendicularly from the leg portion 70 a distance equal to the thickness of the planar body 24 plus the thickness of a panel. To illustrate the manner in which clamp 68 functions, reference is made to FIGS. 10 and 11.

Figure 10:
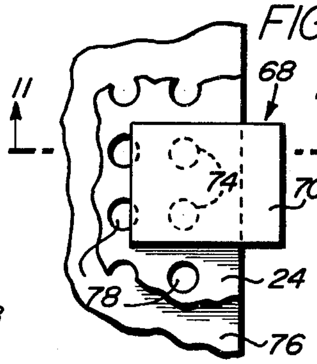
FIG. 10 is a fragmentary view the clip of FIG. 9 engaged with a planar body and a panel.
Figure 11:
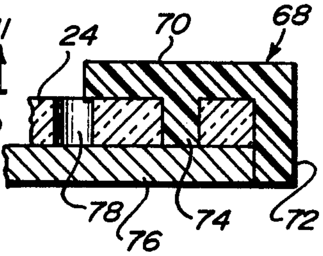
FIG. 11 is a cross-sectional view of the clip, planar body and panel taken along the line A—A in FIG. 10.

FIG. 10 is a fragmentary view showing a portion of a panel 76 underlying a planar body 24 having a plurality of circular openings 78 therethrough. Referring now to FIG. 11, which is a cross-sectional view taken through the line 11—11 of FIG. 10, the engagement and interrelationship of the different components can be seen more readily. Thus, panel member 76 is shown underlying planar body 24 which contains circular openings 78. Clamp 68 is positioned so that the leg portion 70 is superimposed on planar body 24 such that lug 74 extends into and is engaged by a circular opening 78. The foot portion 72 and lugs 74 are positioned relative to each other such that when lug 74 engages a circular opening 78 foot portion 72 registers with the edge of planar body 24 and extends beyond a distance sufficient to permit engagement with the edge of panel 76 thereby permitting accurate registration of panel 76 with superimposed planar body 24.

Figure 12:
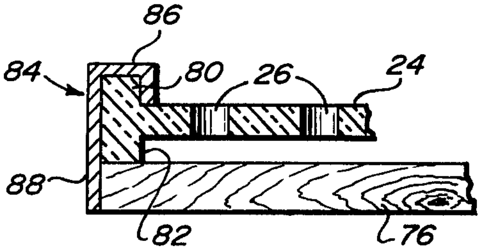
FIG. 12 is a cross-sectional view of another embodiment of my invention shown with a clip device for alignment of work.

FIG. 12 is a fragmentary, cross-sectional view of an embodiment of my invention showing a preferred structure for insuring proper alignment of the device of this invention and a panel. In this figure the planar body 24 having a matrix of openings 26 is shown overlying a panel 76. In this particular embodiment the peripheral edge of planar body 24 is provided with an upwardly extending lug 80 and a downwardly extending lug 82. A "J-shaped" clip 84 having a hooked portion 86 and a body portion 88 is also provided. The hooked portion 86 of clip 84 is adapted to engage upwardly extending lug 80, while the body portion 88 extends along the periphery of planar body 24 and beyond downwardly extending lug 82. As shown in FIG. 12, the clip 84 is illustrated in the form of an inverted J. The downwardly extending lug 82 functions to space the planar body 24 away from (i.e. above) the panel 76, which it overlies. The section of the body portion 88 of clip 84 which extends beyond (i.e. below) the end of downwardly extending lug 82 is adapted to bear against the edge of panel 76, thereby registering planar body 24 with and above panel 76 to insure accurate relative positioning of the planar body 24 with the panel 76.

It will be understood that the planar body 24 of this invention can be provided with a plurality of sets of lugs 80 and 82 extending upwardly and downwardly from planar body 24 at various positions about the periphery of planar body 24. Alternatively, the planar body 24 can be fabricated with a single upwardly extending lug 80 and a single downwardly extending lug 82 running about the entire periphery of planar body 24. Such fabrication permits the flexibility of attaching clips 84 at varying positions about the periphery of planar 24 as dictated by the particular utilization of the device.

Figure 13:
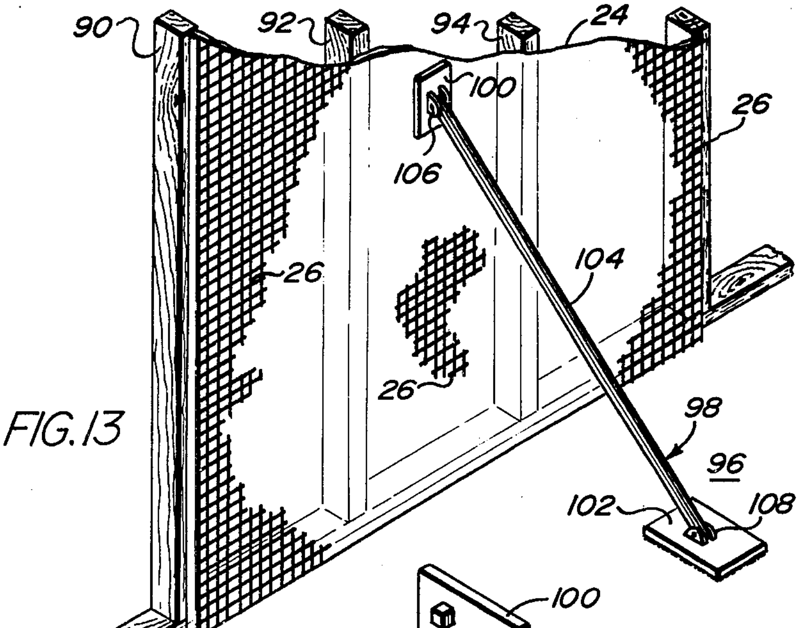
FIG. 13 is a fragmentary perspective view showing ancillary equipment.

FIG. 13 illustrates an employment of the device of this invention in conjunction with an ancillary item of equipment which facilitates utilization by a single operator. Thus, in this fragmentary view, the planar body 24 containing a matrix of openings 26 is shown superimposed over a work area represented by studs 90, 92 and 94 extending vertically from horizontal floor 96.

In this figure it will be seen that the planar body 24 is maintained in its position superimposed on the work area by means of support device 98 comprising a plate 100 adapted for engagement with the planar body 24, a second plate 102 adapted for engaging the floor 96, and rigid support bar 104. The support bar 104 interconnects plates 100 and 102 and is affixed at one end thereof to plate 100 by means of pivot mount 106 and is affixed at the other end thereof to plate 102 by means of pivot mount 108. The support device operates by means of plate 100 engaging the matrix of openings through planar body 24 and by means of the under surface of plate 102 engaging floor 96, such as, for example, by frictionally engaging the floor 96. The means for plate 102 frictionally engaging floor 96 are well known in the art including, for example, covering the under surface of plate 102 with a material known to have a high coefficient of static and/or sliding friction, e.g., a ribbed, rubber mat. Plate 100, however, is provided with specific means for engaging the matrix of openings 26 planar body 24.

Figure 14:
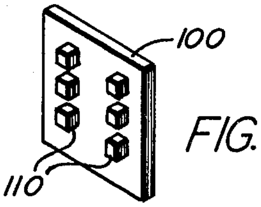
FIG. 14 is an enlarged perspective of one of the components shown in FIG. 13.

Referring now to FIG. 14, there is illustrated one embodiment of the surface of plate 100 adapted to engage the matrix of openings 26. This is the side of plate 100 opposite that to which pivot mount 106 is attached. In this figure there are seen a plurality of lug members 110 extending from the surface of plate 100. The particular lug members 110 illustrated in FIG. 14 are square in cross section and are adapted to be inserted into square openings through planar body 24. As will be understood, if the shape of the openings through planar body 24 are of another configuration, such as circular or lozenge shaped, then the lug members 110 would be of a corresponding shape. Further, the dimensions of lug members 110 are selected so as to be slightly lesser than the dimensions of the openings through planar body 24, thereby facilitating easy insertion of lug members 110 into such openings. To state it in another manner, the shape of lug members 110 and the shape of the openings through planar body 24 are similar but not congruent.

In use, planar body 24 can be positioned so as to overlie a work area, such as that represented by studs 90, 92 and 94 in FIG. 13. Next plate 100 can be positioned so as to engage planar body 24 by means of inserting lug members 110 into a portion of the matrix of openings 26 extending through planar body 24. Through the functioning of pivot mounts 106 and 108, an operator can then move the support bar 104 of the support device 98 so as to position plate 102 in frictional engagement with floor 96 thereby disposing the support device 98 in a manner that it will maintain the planar body in its position superimposed over the work area without further assistance of an operator. This frees a single operator from the task of holding planar body 24 in position and leaves the operator free to move about and employ both hands for inserting separate marking means 28 into the matrix of openings 26 in planar body 24 in the manner necessary to define any cut outs.

What is claimed is:

1. An apparatus for indicating on the surface of a panel the location of a portion of the panel to be cut, which apparatus comprises a planar body conforming to the shape of the panel and adapted to be superimposed on and register with the panel, the body also being adapted to be superimposed on a work area, the body having means defining a matrix of openings therethrough, separate means for marking the surface of the panel, the means for marking being adapted for insertion through, registration in and retention by one of the means defining an opening through the body; whereby when the planar body is superimposed on the work area, marking means are registered in the means defining openings through the body conforming to a position in the work area requiring a "cut" in a panel, and the planar body with registered marking means is then superimposed on and registered with a panel, the registered marking means operate to indicate on the surface of the panel the portion thereof to be cut.

2. The apparatus of claim 1 which is further provided with separate clamp means for insuring accurate registration of the planar body with a panel, the clamp means comprising an L-shaped body having a leg portion and a foot portion extending at a right angle from one end of the leg portion, the leg portion being provided with a lug extending therefrom at a right angle and in the same direction as the foot portion, which lug is adapted to be received in and engaged by an opening through the body, the position of the lug and the foot and the sizes thereof relative to the location of the openings through the body and the thickness of the body being selected so that when the lug is received in an opening through the body, the leg portion is juxtaposed along the surface of the body, and the foot portion registers with the edge of the body and extends therebeyond a sufficient distance to permit engagement with the edge of an underlying panel; thereby providing accurate registration of an underlying panel with the superimposed body.

3. The apparatus of claim 2 wherein the leg portion is provided with a plurality of lugs.

4. The apparatus of claim 1 which is further provided with separate clip means for insuring accurate registration of the planar body when superimposed on a panel and wherein the periphery of the body is also provided with oppositely extending first and second lugs disposed perpendicular to the body, the first lug adapted to bear against an underlying panel thereby maintaining the body in a spaced apart relationship with a panel when the body is superimposed thereon, the clamp means comprising a J-shaped member having a hooked portion and a straight body portion, the hooked portion being adapted to engage the second lug, while the body portion extends along the edge of the body and beyond the end of the first lug and is adapted to bear against the edge of a panel; thereby registering the body with an underlying panel.

5. The apparatus of claim 4 wherein the first and second lugs extend about the entire periphery of the planar body.

6. The apparatus of claim 1 which is further provided with a separate support means for maintaining the planar body in a substantially upright position superimposed on a work area, the support means comprising a rigid support member having a first means at one end thereof adapted for engaging the surface of the planar body and second means at the other end thereof adapted for engaging a substantially horizontal floor, the rigid support member being of a length at least 60% of the vertical dimension of the planar body when disposed in a substantially upright position so that the rigid support member is maintained in compression when the first and second means are engaged and a force having a substantially horizontal component is transmitted to the planar body; thereby maintaining the body superimposed on the work area.

7. The apparatus of claim 6 wherein the first and second means are plates pivotally mounted at the ends of the support member with the first means being provided with a plurality of lug members extending from the surface of the plate and adapted to engage openings through the planar body, and the second means is adapted for frictional engagement with the floor.

* * * * *